United States Patent
Smith

(10) Patent No.: US 6,437,078 B1
(45) Date of Patent: Aug. 20, 2002

(54) ALIPHATIC POLYUREA PREPOLYMERS, COMPOSITIONS AND METHODS

(75) Inventor: Stuart B. Smith, Conyers, GA (US)

(73) Assignee: Hehr International Inc., Los Angeles, CA (US)

( * ) Notice: Subject to any disclaimer, the term of this patent is extended or adjusted under 35 U.S.C. 154(b) by 0 days.

(21) Appl. No.: 09/775,898

(22) Filed: Feb. 2, 2001

(51) Int. Cl.[7] .............................................. C08G 18/50

(52) U.S. Cl. .............................. 528/78; 528/73; 528/78; 252/182.2; 252/182.22; 560/132

(58) Field of Search ......................... 528/73; 252/182.2, 252/182.22; 560/132

(56) References Cited

U.S. PATENT DOCUMENTS

| | | | |
|---|---|---|---|
| 4,584,325 A | 4/1986 | Smith |
| 4,616,043 A | 10/1986 | Smith |
| 4,670,346 A | 6/1987 | Smith |
| 4,738,989 A | 4/1988 | Smith |
| 4,748,192 A | 5/1988 | Smith |
| 4,748,202 A | 9/2000 | Smith |
| 6,114,402 A | 9/2000 | Smith |

Primary Examiner—Rachel Gorr
(74) Attorney, Agent, or Firm—Leslie Meyer-Leon, Esq.; IP Legal Strategies Group P.C.

(57) ABSTRACT

An aliphatic polyurea prepolymer prepared by the catalyst-free, exothermic reaction of a caprolactone monomer, an aliphatic primary polyamine, and an aliphatic monomer-free polyisocyanate, such as a hexamethylene diisocyanate dimer or trimer or mixtures thereof.

10 Claims, No Drawings

ALIPHATIC POLYUREA PREPOLYMERS, COMPOSITIONS AND METHODS

BACKGROUND OF THE INVENTION

Urethane prepolymers prepared by the reaction of a polyisocyanate and a polyol or amine to produce a prepolymer or oligomer with free isocyanate groups (NCO) are often prepared and used as prepolymer-oligomer additives to polyurethane compositions, such as foamable polyurethane compositions (see, for example, U.S. Pat. No. 6,114,402, issued Sep. 5, 2000).

Government regulations regarding the use and preparation of polymers and prepolymers dictate the type of products that can be used in the preparation of the polymers and prepolymers. Typically, aliphatic polyisocyanates, like hexamethylene diisocyanate (HDI), isophorone diisocyanate (IPDI), and mixtures thereof, contain HDI or IPDI monomer components which, in use, are dangerous when sprayed or poured, since they create vapors that are unhealthy to workers.

It is desirable to provide prepolymer polymer compositions containing the prepolymer and methods of preparation and use which reduce the hazards associated with monomer vapors and to produce easily prepared, stable, aliphatic polyurea prepolymers.

SUMMARY OF THE INVENTION

It has been discovered that stable aliphatic polyurea prepolymers can be prepared without the employment of a catalyst to promote the reaction or the use of heating cycles. The prepolymers of the invention are prepared in a rapid, exothermic reaction essentially or substantially free of the need or requirement of catalyst, like an organo metallic or other typical polymerization catalyst. The aliphatic polyurea prepolymers are characterized by a plurality of uretidione groups, e.g., The prepolymers have low molecular weight, usually 4000 to 5000 or less, and are characterized by good chemical and weather resistance, particularly where the primary amine comprises the reaction of an alkoxy $C_2$–$C_3$ diamine with a caprolactone monomer and a dimer polyisocyanate.

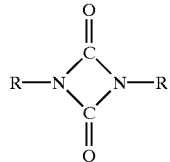

The invention comprises a method for the preparation of an aliphatic polyurea prepolymer prepared by a rapid, exothermic mixing reaction in the absence of a promoter catalyst of: a primary aliphatic polyamine; a caprolactone monomer, the polyamine reacting with the caprolactone monomer to provide an open chain, linear aliphatic reaction molecule with a functional, terminal amine group at one end of the molecule and a functional hydroxy group at the other end of the molecule, the linear molecule reacting in the mixture with an aliphatic polyisocyanate with less than about one percent of the monomer, the polyisocyanate reacting with each of the end groups to provide an aliphatic polyurea prepolymer.

Preferably, the reaction is carried out at an ambient temperature, e.g., 20 to 30° C. in a common reaction vessel or reactor employing vigorous agitation, with the addition of the primary amine to the caprolactone monomer, followed by the addition of the polyisocyanate, with less than about 1% by weight of free polyisocyanate monomer, typically, less than 0.5 to 0.2%. The monomer may be removed by a vapor extraction process or other means to remove or reduce the free monomer content. The reaction is exothermic, and no heat or catalyst is required, with the reaction completed in, generally, 10 to 20 minutes or less.

The necessary amount of reactant to produce a prepolymer with desired functional groups may vary. For example, the reactants may be employed in more or less stoichiometric amounts. Where the prepolymer is to be used as a reactive additive prepolymer in other polymeric reactions or compositions, such as an additive, e.g., 1 to 20 percent by weight with foamable polyurethane compositions or other polymer composition, then the amount of polyisocyanate is arranged to provide free isocyanate groups in the polyurea prepolymer, for example, about 2 to 35%, like 12 to 22% free isocyanate groups.

The polyisocyanates employed should be aliphatic polyisocyanates, preferably with reduced monomer content, e.g., less than 10%, like a dimer, such as HDI(OCN–[CH$_2$]$_6$ NCO), with substantially low monomer content. The aliphatic polyisocyanate may be a polymethylene or substituted methylene polyisocyanate, like HDI or IPDI, particularly in the dimer, trimer, or mixture form, for example, the HDI dimer:

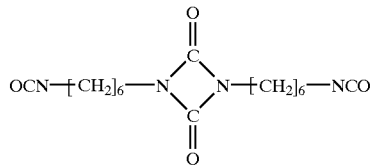

or the trimer:

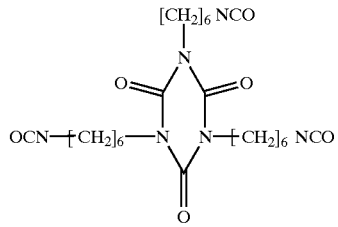

The aliphatic primary amine (R-NH$_2$) is the base employed to open the heterocyclic lactone ring. It is preferred to employ aliphatic primary diamine, and more particularly, low molecular weight, e.g., 2000 to 4000, polyether polyamines, such as polyalkoxy $C_2$–$C_3$ diamines-triamines, like polyethoxy or polypropoxy diamines or trimamines, known in the trade as D-2000 Jeffamine (polyether diamine) and D-3000 Jeffamine (polyether triamine).

In the invention, the capa ring molecule used comprises heterocyclic inner esters of carboxylic acid, such as the capa polyhydroxyl lactams and lactones, which is reacted or treated with a base, e.g., a primary aliphatic polyether amine, to open the heterocyclic ring and amine to provide a functional amine group at one end and a functional hydroxy group at the other end of the open chain inner ester. Such inner hydroxy capro esters may be represented by the general structural formula of lactams and lactone:

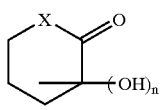

wherein X is a nitrogen to form a lactam or X is an oxygen to form a lactone and n is a number from 0 to 4, typically 2 to 3. The caprolactone monomer and the caprolactone diols and triols, known in the trade under the trademark TONE® (TONE® is a registered trademark of Union Carbide Chemicals and Plastics Technology Corporation of Danbury, Conn.), are the preferred heterocyclic ring compounds used in the reaction.

The aliphatic polyurea prepolymer may contain various additives and components as required by a particular usage, such as, but not limited to: surfactants; flame retardants; blowing agents; solvents; diluents; biocides; plasticizers; antistatic agents; antioxidants; catalysts; stabilizers; plasticizers; viscosity control agents; fillers; pigments; dyes; and polymer and resin additives; alone or in various combinations. The prepolymer may also contain reinforcing agents, like particulate material, such as silica and carbon particles; and fibers, like carbon and glass fibers. The aliphatic polyisocyanate may be used with free isocyanate groups alone or as a prepolymer or an oligomer with free NCO groups.

The invention will be described for the purpose of illustration only in connection with certain illustrative representative examples; however, it is recognized that those persons skilled in the art may make various changes, improvements, and additions to the Examples, all falling within the spirit and scope of the invention.

DESCRIPTION OF SPECIFIC EMBODIMENTS

EXAMPLE 1

HDI is reacted with a caprolactone diol (hydroxy number 200) to produce a 15% NCO prepolymer.

HDI is added to the reactor, and the appropriate amount of caprolactone diol (hydroxy number 200) and tin catalyst, dibutyl tin dilauralate, is added. The mixture is agitated, and the temperature is brought to 80° C. for 4 hours. The residual HDI monomer is greater than 10% PBW (parts by weight).

Example 1 is illustrative of a prior art reaction with a high monomer HDI and no primary amine.

EXAMPLE 2

N-3400, manufactured by Bayer, is a monomer extracted dimer. D-2000 Jeffamine, manufactured by Huntsman, is a polyether diamine. The procedure is as follows:

500 pounds of N-3400 is added to a 100 gallon mixing container equipped with a high speed shear mixer. 100 pounds of D-2000 Jeffamine is added very slowly to the vortex of the mixer at 1000 r.p.m. Immediately, the exotherm gets to 180° F. from 80° F. Mixing is continued for 15 minutes. Samples are taken and the percentage of NCO is determined to be 15%. Free HDI monomer is less than 0.2%.

EXAMPLE 3

Example 2 is repeated except HA-300, manufactured by Lyndel Chemical, is substituted for N-3400. HA-300 is a trimer with monomer extraction. A 15% NCO is produced with less than 0.2% HDI monomer.

EXAMPLE 4

Caprolactone monomer and D-2000 Jeffamine are mixed at a weight ratio of 3 to 1 (D-2000 Jeffamine/capa). This mixture is slowly added to HA-300, as in Examples 2 and 3. The 180° F. exotherm is generated, and a 15% NCO prepolymer is produced with a caprolactone backbone on one isocyanate group and a diamine on another isocyanate group.

What is claimed is:

1. A method for the preparation of an aliphatic polyurea prepolymer comprising the step of mixing in the absence of a promoter catalyst:
   a) a primary aliphatic polyether polyamine;
   b) a caprolactone monomer, the polyamine reacting with the caprolactone monomer to provide an open chain, linear aliphatic reaction molecule with a functional, terminal amine group at one end of the molecule and a functional hydroxy group at the other end of the molecule; and
   c) an aliphatic polyisocyanate with less than about one percent of the monomer, the polyisocyanate reacting with the end groups to provide an aliphatic polyurea prepolymer.

2. The method of claim 1 wherein the caprolactone monomer comprises a caprolactone diol, triol, or mixture thereof.

3. The method of claim 1 wherein the polyamine comprises a $C_2$–$C_3$ polyalkoxy diamine or triamine.

4. The method of claim 1 wherein the aliphatic polyisocyanate comprises a hexamethylene diisocyanate dimer, trimer, or mixture thereof.

5. The method of claim 1 wherein the prepolymer has a molecular weight of less than about 5000 and has free isocyanate groups.

6. The method of claim 1 wherein the prepolymer has from about 2 to 18 free isocyanate groups.

7. The polyurea prepolymer produced by the method of claim 1.

8. A polyurethane composition to which has been added from 1 to 20 percent by weight of the prepolymer of claim 7.

9. A method for the preparation of an aliphatic polyurea prepolymer, wherein the prepolymer has a molecular weight of less than about 5000 and has free isocyanate groups, the method comprising the step of mixing in the absence of a promoter catalyst:
   a) a primary aliphatic polyether polyamine, wherein the polyamine comprises a $C_2$–$C_3$ polyalkoxy amine;
   b) a hydroxy caprolactone polyol, the primary polyamine reacting with the caprolactone polyol to provide an open chain, linear aliphatic reaction molecule with a functional, terminal amine group at one end of the molecule and a functional hydroxy group at the other end of the molecule; and
   c) an aliphatic polyisocyanate, wherein the aliphatic polyisocyanate comprises a hexamethylene diisocyanate dimer, a hexamethylene diisocyanate trimer, or a mixture thereof, and wherein the aliphatic polyisocyanate has less than about one percent of the monomer, and the polyisocyanate reacts with the end groups to provide an aliphatic polyurea prepolymer.

10. The polyurea prepolymer produced by the method of claim 9.

* * * * *